United States Patent [19]

Kondo

[11] Patent Number: 5,573,583
[45] Date of Patent: Nov. 12, 1996

[54] METHOD OF ACTIVATION OF CLAY AND ACTIVATED CLAY

[75] Inventor: Mitsuji Kondo, Tochigi, Japan

[73] Assignee: Hojun Kogyo Co., Ltd., Annaka, Japan

[21] Appl. No.: 425,533

[22] Filed: Apr. 20, 1995

[30]　　Foreign Application Priority Data

Dec. 20, 1994　[JP]　Japan ..................................... 6-316913

[51] Int. Cl.$^6$ ...................................................... C09C 1/42
[52] U.S. Cl. ...................... 106/287.17; 501/146; 501/148
[58] Field of Search ....................... 106/282.17; 501/146, 501/148

[56]　　　　　References Cited

U.S. PATENT DOCUMENTS 3,855,147　12/1974　Granquist ........................... 106/287.17
4,434,076　2/1984　Mardis et al. ...................... 106/287.17

OTHER PUBLICATIONS

Nature, vol. 173, No. 4397, Feb. 6, 1954, pp. 255–256.
Clays and Clay Minerals, vol. 22, pp. 361–365, Pergamon Press, 1974, S. Olejnik et al.: *Swelling of Montmorillonite in Polar Organic Liquids*.
Clay Minerology, Ralph E. Grim, McGraw–Hill Book Company, Inc., 1953, p. 266.

*Primary Examiner*—David Brunsman
*Attorney, Agent, or Firm*—Kenyon & Kenyon

[57]　　　　　ABSTRACT

A method for activating smectite clays to give swelling power and/or dispersibility in an aqueous electrolyte solution and resulting activated smectite clays are disclosed, the method comprising previously adding an adequate amount of an aprotic polar solvent having a higher relative permittivity than those of alcohols (e.g., N,N-dimethylformamide, N,N-dimethylacetamide, ethylene carbonate, propylene carbonate or dimethyl sulfoxide) to an aqueous electrolyte solution in which the clays (or the clays previously suspended) are to be swollen and/or dispersed, or treating the clays to be swollen and/or dispersed with the compound.

12 Claims, No Drawings

METHOD OF ACTIVATION OF CLAY AND ACTIVATED CLAY

FIELD OF THE INVENTION

This invention relates to a method for activating smectite clays and activated smectite clays obtained by the method. More particularly, it relates to a method for rendering smectite clays swellable and/or dispersible in a nonaqueous solution having dissolved therein an inorganic electrolyte, such as a brine (e.g., seawater) or a cement/water system (e.g., mortar or concrete), which is incapable of swelling smectite clays, and to activated smectite clays obtained by the method.

BACKGROUND OF THE INVENTION

Bentonite mainly comprising a mineral clay montmorillonite is typical of smectite clays. It has outstanding swelling power or dispersibility in water, increasing in volume several times as much as its own volume on being swollen with water, to form a semi-solid gel or a highly viscous colloidal dispersion. However, the medium in which bentonite exhibits such high swelling power or dispersibility is confined to a fresh water system containing no or little electrolyte, and there has been no technique for swelling smectite clays such as bentonite with an aqueous electrolyte solution containing an inorganic electrolyte in a high concentration, such as a brine (e.g., seawater), a mortar/water system or a concrete/water system. A conventional method for dispersing smectite clays, e.g., bentonite in such an aqueous electrolyte solution comprises swelling a smectite clay with fresh water, followed by dispersing, and adding to the dispersion an anionic surface active agent, such as a sodium alkylsulfate, a sodium alkanesulfonate or sodium humate; a condensed phosphate, such as tetrasodium pyrophosphate or sodium hexametaphosphate; or a polyelectrolyte, such as sodium polyacrylate or a partial hydrolysis product of polyacrylamide, to increase the electrostatic repulsive force among the clay particles thereby dispersing the particles to colloidal particles. Since the dispersion obtained in this manner has insufficient viscosity, it has been a practice followed when a high viscosity is required as is usual to increase the viscosity to a desired level by addition of a large quantity of an expensive substance, such as xanthan gum. For the time being, there is no means available for letting a smectite clay fully exhibit its characteristic swelling power in an aqueous electrolyte solution. For example, Nature, Vol. 173, No. 4397, pp. 255–256 (1954) contains an article entitled "Crystalline Swelling of Montmorillonite—Use of Electrolyte for Swell Control", which elucidates that the swelling of sodium montmorillonite in an aqueous sodium chloride solution having a concentration of not less than 0.3N (about 1.8% on a mass basis) is limited crystalline swelling.

While the characteristic of smectite clays which is advantageously used in industry is the so-called osmotic swelling attended by remarkable volume expansion far beyond crystalline swelling, smectite clays cannot exhibit the osmotic swelling in an aqueous electrolyte solution due to the dehydrating effect and charge neutralizing effect of an electrolyte on colloidal particles.

S. Olejnik, A. M. Posner and J. P. Quirk, *Clays and Clay Minerals*, Vol. 22, pp. 361–365 (1974) examined swelling of montmorillonite in a polar organic liquid whose dipole moment is approximate to that of water and whose relative permittivity is higher than that of water and reported that montmorillonite shows the osmotic swelling only in formamide $HCO-NH_2$ and N-methylformamide $HCO-NH(CH_3)$. However, the present inventors have confirmed that these liquids have no effect to activate smectite clays so as to exhibit the osmotic swelling in an aqueous electrolyte solution. These organic solvents, while having a high relative permittivity, are protonic solvents as is apparent from their molecular formulae and are therefore assumed to behave like water to an electrolyte.

Organic ammonium bentonite obtained by cation exchange treatment of bentonite with a long chain fatty ammonium ion, e.g., an octadecylammonium ion can be activated by addition of a low-molecular weight highly polar substance, such as methanol or ethanol, and is thereby made substantially swellable with an organic liquid, as reported in R. E. Grim, *Clay Mineralogy*, p. 266, McGraw-Hill Book Co., Inc., (1953). Nowadays organic ammonium bentonite, called organophilic bentonite, is commercially supplied as a thickener for organic solvent type paints or printing inks or a gelatinizer for lubricating grease under the trade name of "Organite" (manufactured by Nihon Yuki Nendo K.K.), "S-Ben" (manufactured by Nihon Yuki Nendo K.K.), "Orben" (manufactured by Shiraishi Kogyo K.K.), "Bentone" (manufactured by Rheox Inc., U.S.A.) or "Claytone" (manufactured by Southern Clay Products, Inc.). In using such organophilic bentonite, a combined use with a highly polar additive, such as methanol, ethanol, acetone or propylene carbonate, has been widespread. However, being utterly water-repellent, the organophilic bentonite is applicable only to middle to low polar organic liquids, such as mineral spirit, toluene, xylene, dioctyl phthalate, and petroleum lubricating oils, and is essentially non-wettable, non-swellable and non-dispersible with an aqueous electrolyte solution such as a brine or a cement slurry.

Swelling power and colloidal dispersibility of bentonite in a fresh water system has been utilized as a soil-drilling stabilizing fluid in civil engineering work or as a drilling fluid in drilling of an oil well, a geothermal well, a well, etc. However, the bentonite soil-drilling stabilizing fluid or drilling fluid undergoes serious deterioration when in contact with a salty underground water (i.e., a brine) in offshore-drilling on a continental shelf or a coastal area.

Bentonite has been used in a cement grout for preventing sedimentation of cement, but bentonite particles undergo flocculation due to an alkali eluted from cement, making it difficult to control the fluidity of the grout. Further, it has been impossible to incorporate bentonite into a cement grout in a high concentration for improving sealing properties.

Swellable clays such as bentonite are of extreme importance as a component for making ground impervious to water, and are utilized as a sealant for prevention of water leakage from the side walls or bottoms of paddies, reservoirs, and ponds. They also have found their use as an impervious layer-forming soil conditioner for prevention of pollution with water from landfills of industrial wastes. In every application, they are effective only on fresh water, and their water impermeability is not sufficient against attack of a brine, such as seawater.

A technique of laying geosynthetic clay liners is used for protection of underground structures from penetration of underground water, the geosynthetic clay liners being a laminated material composed of a geomembrane made of a durable synthetic resin and a layer of fine bentonite particles. When used in sites subject to the attack of a brine such as seawater, the geosynthetic clay liners must be swollen with fresh water beforehand, making it difficult to carry out the technique.

The aforesaid practical disadvantages of smectite clays are attributed to the fact that a clay mineral smectite, the main component of smectite clays, belongs to hydrophobic colloid and, in nature, is flocculated by the action of an electrolyte and does not become colloid.

SUMMARY OF THE INVENTION

An object of the present invention is to provide a method for eliminating the aforesaid disadvantages of smectite clays and activated smectite clays free from the disadvantages. That is, the object is to provide a method for activating smectite clays so that they may be swollen with and/or dispersed in an aqueous electrolyte solution to the same degree as with and/or in fresh water and to provide activated smectite clays.

Water swelling power of smectite is intercalated as interaction between exchangeable cations (e.g., a sodium ion, a magnesium ion, and a calcium ion) and water molecules which are both present in interlaminar sites of lattice layers and the surfaces of the lattice layers. More specifically, hydrating force of water molecules on the exchangeable cations, dipole moment of water molecules, hydrogen bonding force between hydrogen atoms and an oxygen atom of water molecules, electrostatic attraction between exchangeable cations and negatively charged crystal layers, and the like are mutually acting on each other in the interlaminar space.

The present inventors have searched for a substance capable of increasing swelling power of smectite clays with an aqueous electrolyte solution from among a group of polar substances which have such strong affinity to inorganic cations as to dissolve inorganic electrolytes and also have capability of infinitely dissolving water or being infinitely dissolved in water and found, as a result, N,N-dimethylformamide, N,N-dimethylacetamide, ethylene carbonate, propylene carbonate, and dimethyl sulfoxide to fill the demand. All these organic compounds have a higher relative permittivity than those of alcohols and, as is apparent from their molecular structure, they are aprotic polar solvents having no hydrogen donating properties.

One means for accomplishing the object of the present invention is a method for activating smectite clays, in which smectite clays are formed into powder, granules or water-containing paste; an adequate amount of at least one of aprotic polar solvents having a high relative permittivity than those of alcohols, such as N,N-dimethylformamide, N,N-dimethylacetamide, ethylene carbonate, propylene carbonate, and dimethyl sulfoxide, is added thereto in the form of liquid or an aqueous solution and thoroughly mixed to be absorbed into the smectite clays.

Another means is a method for activating smectite clays, in which powdered smectite clays are added to an aqueous electrolyte solution having previously dissolved therein an adequate amount of an aprotic polar solvent having a high relative permittivity than those of alcohols.

Still another means is a method for activating smectite clays, in which powdered smectite clays are added to an aqueous electrolyte solution to obtain a suspension of flocculated particles; and an adequate amount of an aprotic polar solvent having a higher relative permittivity than those of alcohols is then added to the suspension.

Another object of the present invention is to provide an activated smectite (including a synthetic silicate having a smectite structure) having absorbed therein an adequate amount of an aprotic polar solvent having a higher relative permittivity than those of alcohols.

DETAILED DESCRIPTION OF THE INVENTION

The smectite clays which can be used in the present invention include clay minerals, such as montmorillonite, beidellite, nontronite, saponite, hectorite, and stevensite; natural clays comprising these clay minerals as a substantial element; and synthetic silicates (e.g., Laponite) having a similar layered crystal structure.

The aprotic polar solvents having a higher relative permittivity than those of alcohols are compounds which have strong polarity, have no proton donating properties, and have a higher relative permittivity than those of alcohols, such as compounds having a dimethyl-substituted amino group, e.g., N,N-dimethylformamide (hereinafter abbreviated as DMF), N,N-dimethylacetamide (hereinafter abbreviated as DMA); 1,2-diol carbonic acid esters, e.g., ethylene carbonate and propylene carbonate; and compounds having no hydrogen atom bonded to an oxygen atom, e.g., dimethyl sulfoxide (hereinafter abbreviated as DMSO). In the present invention, ethylene carbonate and propylene carbonate are particularly preferred as the aprotic polar solvent. The chemical formulae and relative permittivity of these organic compounds are shown in Table 1. Those of methyl alcohol, ethyl alcohol, and water are also shown for reference.

TABLE 1

| Organic Compound | Chemical Formula | Relative Permittivity* |
|---|---|---|
| DMF | $HCO-N(CH_3)_2$ | 36.71 (25° C.) |
| DMA | $CH_3CO-N(CH_3)_2$ | 37.78 (25° C.) |
| Ethylene carbonate | $\begin{array}{c} CH_2-O \\ \phantom{CH_2-}\diagdown \\ \phantom{CH_2-O}C=O \\ \phantom{CH_2-}\diagup \\ CH_2-O \end{array}$ | 89.6 (40° C.) |
| Propylene carbonate | $\begin{array}{c} CH_3-CH-O \\ \phantom{CH_3-CH-}\diagdown \\ \phantom{CH_3-CH-O}C=O \\ \phantom{CH_3-CH-}\diagup \\ CH_2-O \end{array}$ | 69.0 (23° C.) |
| DMSO | $\begin{array}{c} CH_3 \\ \phantom{CH_3}\diagdown \\ \phantom{CH_3--}S \longrightarrow O \\ \phantom{CH_3}\diagup \\ CH_3 \end{array}$ | 48.9 (20° C.) |
| Methyl alcohol | $CH_3OH$ | 33.1 (25° C.) |
| Ethyl alcohol | $CH_3CH_2OH$ | 23.8 (25° C.) |
| Water | $H_2O$ | 80.1 (20° C.) |
|  |  | 78.3 (25° C.) |

Note: *According to Yozai Handbook, 1st Ed., Kodansha (1976).

Swelling power of smectite clays with an aqueous electrolyte solution can be evaluated by any of the following methods (1) to (4):

1) Sample clay powder weighing 2 g is added in small portions to 100 ml of an aqueous electrolyte solution and allowed to sediment. The volume of the sample after 24 hours is taken as an indication of swelling power. The test is carried out in accordance with the testing method of Swelling Power of bentonite, specified by U.S. Pharmacopeia National Formulary (USP XXII, NFXVII, PP. 1902, 1990).
2) Sample clay powder weighing 2 g is added to 100 ml of an aqueous electrolyte solution, followed by thoroughly shaking. The volume of the sediment after 24 hours' standing is read.

3) A liquid limit of sample clay is measured using an aqueous electrolyte solution in accordance with the testing method of liquid limit of soil, specified in ASTM D4318-84 (corresponding to JIS A-1205 (1990)).

4) A dispersion or suspension of sample clay is prepared by means of a stirrer, and the change in viscosity is measured. Additionally, the dispersion or suspension is subjected to constant pressure filtration, and the filtration speed was examined to obtain information regarding dispersibility.

The amount of the aprotic polar solvent to be used cannot be generally specified because it varies depending on the kind and concentration of the electrolyte of the electrolyte solution, and the kind and the manner of addition of the aprotic polar solvent. While not limiting, the aprotic polar solvent is usually used in an amount of at least 5 parts by weight, preferably at least 10 parts by weight, particularly preferably 10 to 100 parts by wight, per 100 parts by weight of smectite clays.

The aqueous electrolyte solution which can be used in the present invention includes aqueous solutions containing various electrolytes, such as seawater, a cement slurry, urine, and an aqueous acid or alkali solution.

The aprotic polar solvent having a higher relative permittivity than those of alcohols exists in the interlaminar space of smectite crystal layers together with an inorganic electrolyte because of its aprotic polar solvent effect and develops association also with water molecules through dipolar association without releasing a proton thereby weakening the electrostatic attraction between cations and the smectite crystal layer surfaces. As a result, the smectite shows osmotic swelling in an aqueous electrolyte solution.

The present invention will now be illustrated in greater detail with reference to Examples, but it should be understood that the present invention is not construed as being limited thereto. Unless otherwise indicated, all the parts and percents are by weight.

EXAMPLE 1

In a mortar mixer were poured 400 g of portland cement and 100 g of bentonite ("Asama", produced by Hojun Kogyo Co., Ltd.). After stirring for 5 minutes, 1.0 l of tap water was added thereto, and the stirring was continued for 5 minutes. A prescribed amount of a 50 wt % aqueous solution of ethylene carbonate was added thereto, and the stirring was further continued. The change of viscosity with time was measured with Funnel Viscometer. The results obtained are shown in Table 2 below. As is apparent from the results of Table 2, addition of ethylene carbonate to a cement slurry containing bentonite activates the bentonite to bring out its swelling power. It is also seen that the pot life of a cement slurry may be controlled by adjusting the amount of ethylene carbonate added. The embodiment shown in Example 1 is particularly effective as a bentonite-rich formulation for a cement grout.

TABLE 2

| Time Elapsed (hr) | Funnel Viscosity (sec/500 ml, 25° C.) Amount of Ethylene Carbonate Added (g) | | | | |
|---|---|---|---|---|---|
| | 0 | 10 | 20 | 30 | 30* |
| 0 | 21.1 | 22.6 | 21.2 | 22.4 | 20.1 |
| 0.5 | — | 24.3 | 23.1 | 26.0 | — |
| 1.0 | 21.2 | 24.0 | 23.2 | 26.9 | 19.9 |

TABLE 2-continued

| Time Elapsed (hr) | Funnel Viscosity (sec/500 ml, 25° C.) Amount of Ethylene Carbonate Added (g) | | | | |
|---|---|---|---|---|---|
| | 0 | 10 | 20 | 30 | 30* |
| 1.5 | — | 24.0 | 23.4 | 27.1 | — |
| 2.0 | 22.0 | 24.0 | 23.4 | 27.4 | 20.3 |
| 2.5 | — | 24.2 | 23.8 | 27.7 | — |
| 3.0 | 22.7 | 24.5 | 24.0 | 28.3 | 20.1 |
| 3.5 | — | 25.1 | 24.3 | 29.3 | — |
| 4.0 | 24.1 | 25.4 | no fluidity | 30.3 | 20.1 |
| 4.5 | — | 26.6 | | 34.1 | — |
| 5.0 | 26.1 | 27.4 | | 39.7 | 20.2 |
| 5.5 | — | 28.7 | | no fluidity | — |
| 6.0 | 30.4 | 30.6 | | | 20.3 |
| 6.5 | 31.5 | 33.4 | | | — |
| 7.0 | 33.7 | 37.9 | | | 20.1 |
| 7.5 | 38.8 | 44.5 | | | — |
| 8.0 | 42.3 | no fluidity | | | 20.2 |
| 8.5 | no fluidity | | | | 20.2 |

Note:
*Containing no bentonite.

EXAMPLE 2

To 1000 g of 8 wt % water-containing bentonite ("Superclay", produced by Hojun Kogyo Co., Ltd.) produced in Wyoming, U.S.A., were added 450 ml of water and a prescribed amount of 1,4-dioxane, ethylene glycol, formamide, N-methylformamide, DMF, DMA, acetamide or propylene carbonate. After thorough mixing, the mixture was passed through an extrusion granulator, dried in an electric constant temperature drier of blow type at 60° C., and pulverized to mesh in a Micron Bantam mill (manufactured by Hosokawa K. K.). The swelling power of the resulting powder as measured in artificial seawater having the following composition is shown in Table 3 below.

| Composition of Artificial Seawater: | |
|---|---|
| Sodium chloride | 2.453 wt % |
| Magnesium chloride | 0.520 wt % |
| Calcium chloride | 0.116 wt % |
| Potassium chloride | 0.0695 wt % |
| Sodium sulfate | 0.409 wt % |
| Sodium hydrogencarbonate | 0.0201 wt % |
| Potassium bromide | 0.0101 wt % |
| Electric conductivity | 45300 μS/cm (25° C.) |
| pH | 7.85 (25° C.) |

TABLE 3

| Organic Compound | Swelling Power of Bentonite (ml/2 g-clay) Amount of Organic Compound Added (part/100 parts-bentonite) | | | |
|---|---|---|---|---|
| | 0 | 10 | 20 | 30 |
| Blank | 13.5 | — | — | — |
| 1,4-Dioxane | — | 10.2 | 10.2 | 10.2 |
| Ethylene glycol | — | 12.0 | 12.0 | 12.5 |
| Formamide | — | 12.9 | 12.5 | 12.0 |
| N-Methylformamide | — | 13.9 | 14.0 | 14.3 |
| DMF | — | 26.2 | 25.5 | 22.0 |
| DMA | — | 20.2 | 24.0 | 22.5 |

TABLE 3-continued

| | Swelling Power of Bentonite (ml/2 g-clay) Amount of Organic Compound Added (part/100 parts-bentonite) | | | |
|---|---|---|---|---|
| Organic Compound | 0 | 10 | 20 | 30 |
| Acetamide | — | 14.2 | 15.2 | 14.4 |
| Propylene carbonate | — | 18.2 | 27.5 | 32.0 |

As is apparent from the results of Table 3, only the clay having been treated with an aprotic polar solvent having a higher relative permittivity than those of alcohol, i.e., DMF, DMA or propylene carbonate, exhibits high swelling power.

EXAMPLE 3

A liquid limit of the bentonite having been treated with 30% propylene carbonate as prepared in Example 2 and non-treated bentonite was measured using natural seawater taken at Teradomari Seashore, Niigata, Japan (electric conductivity: 48500 µS/cm (12° C.); pH: 8.3 (14° C.); nonvolatile content: 3.69%). As a result, the liquid limit of non-treated bentonite was 218%, while that of the 30% propylene carbonate-treated bentonite was 401%, proving that the activated bentonite of the present invention has a high liquid limit, serving as substantially swellable bentonite.

The activated bentonite of the present invention having a high liquid limit in seawater is useful as a soil stabilizer for providing water-impervious ground in coastal areas.

EXAMPLE 4

To 500 ml of seawater from the Sea of Japan was added 60 g of each of the treated bentonite samples prepared in the same manner as in Example 2 and, for comparison, the same non-treated bentonite as used in Example 2, and the mixture was stirred in a Hamilton Beach mixer (manufactured by Hamilton Beach Inc.; a high-speed rotary mixer) for 20 minutes to prepare a suspension. The viscosity of the suspension was measured with a Fann viscometer ("Model 35 SA" manufactured by Farm Instrument Corp.) at 600 rpm, 25° C. The results obtained are shown in Table 5.

TABLE 5

| Sample | Apparent Viscosity (600 rpm, 25° C.) (cP) |
|---|---|
| Non-treated bentonite | 4.8 |
| 20% Propylene carbonate-treated bentonite | 37.1 |
| 10% DMF-treated bentonite | 17.5 |
| 20% DMA-treated bentonite | 23.0 |

The activated bentonite formulations according to Example 4 are useful as a stabilizer for drilling in coastal areas where the underground water is contaminated with seawater.

EXAMPLE 5

To 60 g of bentonite ("Superclay", produced by Hojun Kogyo K.K.) produced in Wyoming, was added 18 g of DMSO and absorbed therein. The treated bentonite was added to 500 ml of seawater from the Sea of Japan, and the mixture was stirred in a Hamilton Beach Mixer for 20 minutes to prepare a suspension. For comparison, a suspension of non-treated bentonite was prepared. Measurement of apparent viscosity and a filtration testing were conducted in accordance with the bentonite testing method specified by U.S. Petroleum Institute. The results obtained are shown in Table 6.

TABLE 6

| | Apparent Viscosity* (cp) | Filtrate** (ml) |
|---|---|---|
| DMSO-treated bentonite | 12.0 | 31 |
| Non-treated bentonite | 5.0 | 47 |

Note:
*: Measured at 600 rpm, 25° C.
**: Filtered at 25° C., 7 kg/cm² for 30 minutes.

The results of Table 6 clearly demonstrate the improvements of the present invention on viscosity and filtration resistance of the suspension.

EXAMPLE 6

Twenty grams of portland cement and 25 ml of tap water were mixed by thoroughly stirring for 1 minute to prepare a cement slurry. Five grams of a smectite type synthetic silicate ("Laponite RD", produced by Laporte Industries, Ltd., U.K.) were added thereto, followed by thoroughly stirring to prepare a portland cement-Laponite slurry. This slurry was used as a blank.

A slurry having the same composition was prepared, and 1 g of propylene carbonate was added thereto. The mixture was stirred, and the change in viscosity with time was examined. The results obtained are shown in Table 7 below. As is apparent from the results of Table 7, Laponite RD is activated in the cement slurry to exhibit notable swelling, thereby rapidly achieving pasting of the slurry.

TABLE 7

| | Slurry Viscosity* (cP, 23° C.) | | |
|---|---|---|---|
| | 30 mins | 60 mins | 120 mins |
| Blank (non-treated) | 1250 | 4100 | 4500 |
| Propylene carbonate-treated smectite type synthetic silicate | 5100 | 9500 | ∞ (pasty with no fluidity) |

Note:
*Measured with a Brookfield viscometer manufactured by Tokyo Keiki K.K. at 6 rpm.

A slurry prepared by thoroughly stirring a mixture of 20 g of the above cement and 25 ml of tap water for 1 minute and then adding 1 g of propylene carbonate thereto had a viscosity of 400 cP after 120 minutes. This clearly verifies that propylene carbonate does not function to increase the viscosity of a cement slurry but to activate Laponite.

EXAMPLE 7

Twenty parts of propylene carbonate were absorbed into 100 parts of a smectite type synthetic silicate Laponite RD in the same manner as in Example 2. Five grams of the resulting activated synthetic silicate were added to a cement slurry consisting of 20 g of portland cement and 25 ml of water in the same manner as in Example 6, followed by stirring. The mixture was in a slurried state for 10 minutes from the addition. Thereafter the viscosity of the mixture increased, and, after 18 minutes from the addition, the mixture became mortar paste with no fluidity as could be applied with a spatula.

EXAMPLE 8

The swelling power of the propylene carbonate-activated bentonite samples prepared in Example 2 was measured in a 1N sulfuric acid aqueous solution. The results obtained are shown in Table 8 below.

TABLE 8

| | Swelling Power of Bentonite (ml/2 g-clay) Amount of Propylene Carbonate Added (part/100 parts-bentonite) | | | |
|---|---|---|---|---|
| | 0 | 10 | 20 | 30 |
| Superclay (untreated bentonite) | 15.5 | — | — | — |
| Activated bentonite | — | 28.5 | 30.5 | 32.0 |

It is seen from the results in Table 8 that the activated bentonite according to the present invention exhibits high swelling power even in an 1N aqueous sulfuric acid solution.

Then, swelling power of the same samples in a 0.5N aqueous sodium hydroxide solution was measured in the same manner as described above. The results obtained are shown in Table 9.

TABLE 9

| | Swelling Power of Bentonite (ml/2 g-clay) Amount of Propylene Carbonate Added (part/100 parts-bentonite) | | | |
|---|---|---|---|---|
| | 0 | 10 | 20 | 30 |
| Superclay (untreated bentonite) | 10.0 | — | — | — |
| Activated bentonite | — | 21.5 | 23.8 | 27.0 |

It is seen from the above results that the activated bentonite according to the present invention exhibits high swelling power even in an aqueous strong alkali solution as well.

Therefore, the activated bentonite according to the present invention is useful as a gelatinizer or thickener for a surface treating agent for metals or a paint remover.

EXAMPLE 9

Urine of livestock or domestic animals is an aqueous solution having dissolved therein large quantities of various kinds of electrolytes. Hence, the inventors prepared a test liquid which simulated urine of domestic animals (artificial urine) as described below and examined the swelling power and liquid limit of 30% propylene carbonate-treated bentonite prepared in Example 2 and untreated bentonite using the test liquid. The results obtained are shown in Table 10. It is seen that the treated bentonite has markedly high swelling power and liquid limit in the artificial urine. These results indicate that the treated bentonite according to the present invention is useful as an absorbent for waste body fluids, such as urine of domestic animals.

TABLE 10

| | Swelling Power (ml/2 g) | Liquid Limit (%) |
|---|---|---|
| Non-treated bentonite | 17.5 | 317 |
| 30% Propylene carbonate-treated bentonite | 25.0 | 451 |

Preparation of Artificial Urine:

Compositions of urine of various animals are described, e.g., in Furuizumi Iwao (ed.), *Jui Seirikagaku*, p. 302, Bun-eido Shuppan (1988), J. J. Kaneko (ed.), *Clinical Biochemistry of Domestic Animals*, 3rd Ed. (translated into Japanese under the supervision of Kubo Shuichiro), p. 881, Kindai Shuppan (1988), and J. J. Kaneko (ed.), *Clinical Biochemistry of Domestic Animals*, 4th Ed., p. 900, Academic Press (1989). By referring to these publications, the artificial urine used in the above test was prepared as follows. Calcium chloride (0.052 g), 0.248 g of magnesium chloride, 57.6 g of sodium dihydrogenphosphate, 8.3 g of 29% aqueous ammonia, and 20 g of urea were dissolved in distilled water to make 1 l. The resulting artificial urine had an electric conductivity of 27600 µS/cm (23° C.) and a pH of 6.6 (23° C.).

The present invention having the above-mentioned construction produces the following effects.

In the stage where powdered smectite clay such as bentonite is added directly to a cement slurry, it is hindered from swelling due to a highly concentrated alkaline electrolyte eluted from cement and mixed as flocculated particles with a cement slurry while keeping the viscosity low. Therefore, a cement slurry having a high smectite clay content can be prepared. Subsequent application of the method of the present invention to the cement slurry provides a smectite clay-rich grout with its pot life controlled arbitrarily. For this kind of use, it is possible to supply a dry blend of cement and powdered smectite clay to the site of construction.

In drilling work in coastal areas, a stabilizing fluid can be prepared using seawater or underground water contaminated with seawater which has conventionally been impossible to use.

Geosynthetic clay liners used as a water barrier or a waterproofing material in civil engineering work have been imperfect against attack of a brine such as seawater. Application of the activated clay of the present invention as a liner material provides completely water-impervious geosynthetic clay liners.

Mixing of the activated clay of the present invention with ground makes the ground completely impervious to a brine.

Use of pure smectite obtained by wet ultracentrifugation as a smectite clay makes it possible to control gelation or rheological behavior of various electrolyte solutions in fine chemical industry.

Application of the present invention brings about improved results in the industrial fields where use of smectite clays has been given up due to difficulty in achieving substantial swelling or colloidal dispersion in an electrolyte solution due to the hydrophobic colloid character of the clays.

While the invention has been described in detail and with reference to specific examples thereof, it will be apparent to one skilled in the art that various changes and modifications can be made therein without departing from the spirit and scope thereof.

What is claimed is:

1. A method for activating a smectite clay comprising treating a smectite clay with at least one aprotic polar solvent having a higher relative permittivity than that of methanol to make the smectite clay swellable and/or dispersable in an aqueous electrolyte solution.

2. A method for activating a smectite clay as claimed in claim 1, wherein said aprotic polar solvent having a higher relative permittivity than those of alcohols is selected from the group consisting of N,N-dimethylformamide, N,N-dimethylacetamide, ethylene carbonate, propylene carbonate, and dimethyl sulfoxide.

3. A method for activating a smectite clay as claimed in claim 1, wherein said smectite clay is a synthetic silicate having a smectite structure.

4. A method for activating a smectite clay to be swollen and/or dispersed in an aqueous electrolyte solution, which comprises first adding to the aqueous electrolyte solution at least one aprotic polar solvent having a higher relative permittivity than that of methanol and then treating said smectite clay with the aqueous electrolyte solution.

5. A method for activating a smectite clay as claimed in claim 4, wherein said aprotic polar solvent having a higher relative permittivity than those of alcohols is selected from the group consisting of N,N-dimethylformamide, N,N-dimethylacetamide, ethylene carbonate, propylene carbonate, and dimethyl sulfoxide.

6. A method for activating a smectite clay as claimed in claim 4, wherein said smectite clay is a synthetic silicate having a smectite structure.

7. A method for activating a smectite clay to be swollen and/or dispersed in an aqueous electrolyte solution which comprises first adding the smectite clay to an aqueous electrolyte solution to obtain a suspension of the smectite clay and then adding to the suspension of the smectite clay at least one aprotic polar solvent having a higher relative permittivity than that of methanol.

8. An activated smectite clay as claimed in claim 7, wherein said aprotic polar solvent having a higher relative permittivity than those of alcohols is selected from the group consisting of N,N-dimethylformamide, N,N-dimethylacetamide, ethylene carbonate, propylene carbonate, and dimethyl sulfoxide.

9. An activated smectite clay as claimed in claim 7, wherein said smectite clay is a synthetic silicate having a smectite structure.

10. A method for activating a smectite clay to be swollen and/or dispersed in an aqueous electrolyte solution which comprises first adding the smectite clay to an aqueous electrolyte solution to obtain a suspension of the smectite clay and then adding to the suspension of the smectite clay at least one aprotic polar solvent having a higher relative permittivity than that of methanol, wherein said aprotic polar solvent is selected from the group consisting of N,N-dimethylformamide, N,N-dimethylacetamide, ethylene carbonate, propylene carbonate, and dimethyl sulfoxide.

11. A method for activating a smectite clay to be swollen and/or dispersed in an aqueous electrolyte solution which comprises first adding the smectite clay to an aqueous electrolyte solution to obtain a suspension of the smectite clay and then adding to the suspension of the smectite clay at least one aprotic polar solvent having a higher relative permittivity than that of methanol, wherein said, smectite clay is a synthetic silicate having a smectite structure.

12. An activated smectite clay swellable and/or dispersable in an aqueous electrolyte solution, which is obtained by treating a smectite clay with at least one aprotic polar solvent having a higher relative permittivity than that of methanol.

\* \* \* \* \*

UNITED STATES PATENT AND TRADEMARK OFFICE
CERTIFICATE OF CORRECTION

PATENT NO. : 5,573,583
DATED : November 12, 1996
INVENTOR(S) : Mitsuji KONDO

It is certified that error appears in the above-indentified patent and that said Letters Patent is hereby corrected as shown below:

| Column | Line | |
|---|---|---|
| 11 | 4 | After "methanol" change "to" to --and--. |
| 11 | 5 | Change "make" to --treating--; change "swellable and/or dispersable in" to --with--. |
| 12 | 30 | Delete "swellable and/or dispers-". |
| 12 | 31 | Delete "able in an aqueous electrolyte solution,". |
| 12 | 33 | After "methanol" insert --and treating said smectite clay with an aqueous electrolyte solution--. |

Signed and Sealed this

Third Day of June, 1997

Attest:

BRUCE LEHMAN

Attesting Officer    Commissioner of Patents and Trademarks